United States Patent
Darbonne

[11] Patent Number: 5,252,347
[45] Date of Patent: Oct. 12, 1993

[54] PROCESS FOR THE PREPARATION OF FROZEN VEGETABLES

[75] Inventor: Luc Darbonne, Milly La Foret, France

[73] Assignee: Societe de developpement de l'industrie agro-alimentaire et de la pepiniere europeene - SODIAPE, France

[21] Appl. No.: 741,641

[22] Filed: Aug. 7, 1991

[30] Foreign Application Priority Data

Aug. 8, 1990 [FR] France .................. 90 10152

[51] Int. Cl.$^5$ .................. A23B 7/00; B65B 55/00
[52] U.S. Cl. .................. 426/393; 62/320; 241/23; 241/DIG. 37; 426/481; 426/518; 426/524
[58] Field of Search .............. 426/524, 518, 393, 481; 241/23, DIG. 37; 62/64, 320

[56] References Cited

U.S. PATENT DOCUMENTS 3,592,666  7/1971  Butler .................. 426/524
4,906,486  3/1990  Young .................. 426/518

FOREIGN PATENT DOCUMENTS

| 809014 | 4/1974 | Belgium . |
| 1001589A6 | 12/1989 | Belgium . |
| 2171862 | 9/1973 | France . |
| 2316559 | 1/1977 | France . |
| 2400847 | 3/1979 | France . |
| 2512533 | 3/1983 | France . |
| 2561076 | 9/1985 | France . |
| 63-294738 | 1/1988 | Japan . |

Primary Examiner—George Yeung
Attorney, Agent, or Firm—Hill, Steadman & Simpson

[57] ABSTRACT

An installation for the preparation of frozen vegetables, comprising from upstream in the downstream direction a device (10) for washing the fresh vegetables and a device (14) for the spin-drying of the washed vegetables; the freezing device (16) of the rapid individual type; at least one device (22) suitable for exerting on the frozen vegetables sufficient mechanical stresses to allow them to be broken into a plurality of fractions; at least one device (23) for sorting the frozen uniform fractions; a device (30) for packaging at least one of the frozen fractions; means for disposing of the fraction or fractions coming from the sorting device and intended not to be used; this installation being specially designed for the preparation of aromatic herbs or plants.

11 Claims, 2 Drawing Sheets

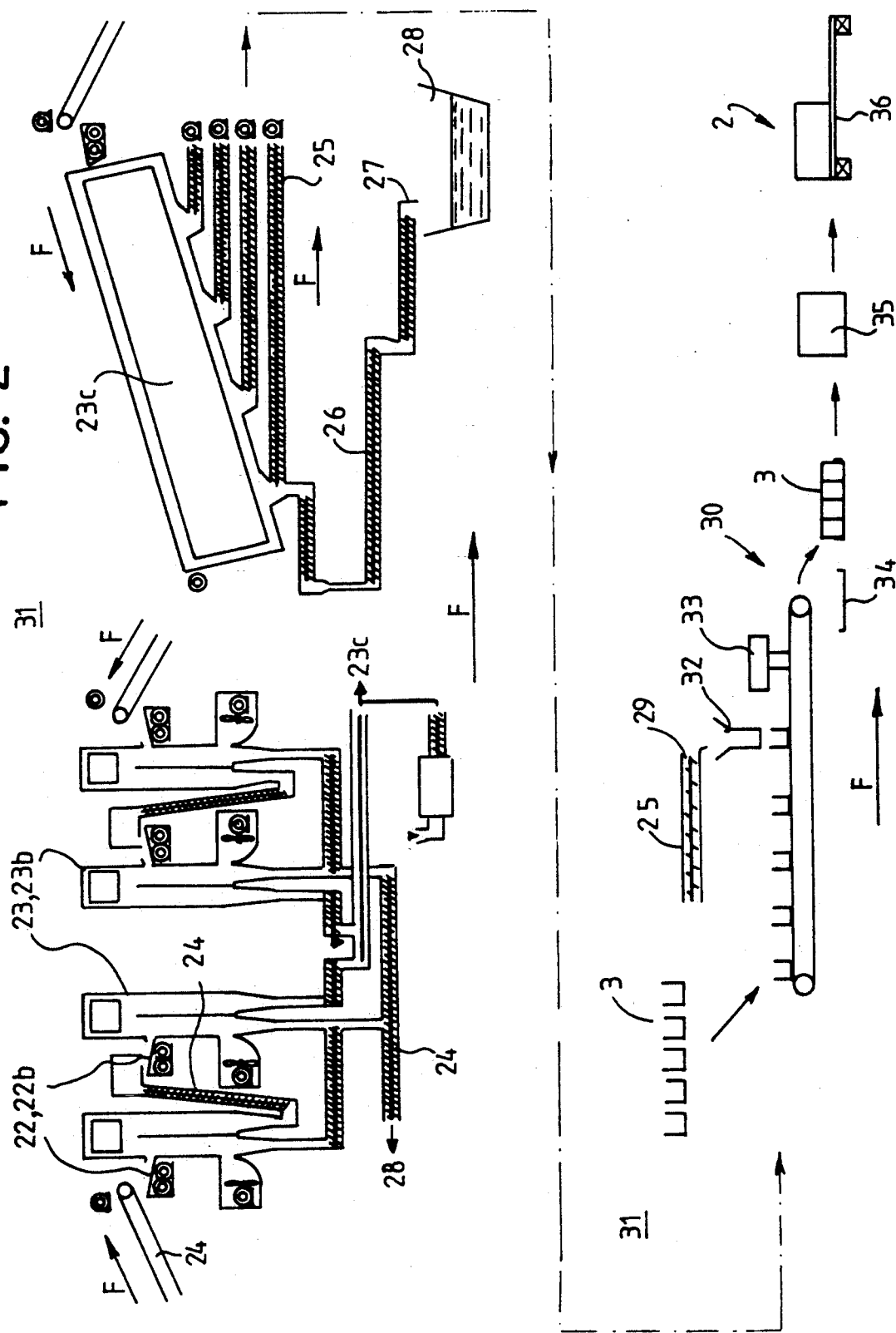

PROCESS FOR THE PREPARATION OF FROZEN VEGETABLES

FIELD OF THE INVENTION

The invention relates to a process and an installation for the preparation of vegetables and more specifically of frozen aromatic herbs or the like. It also relates to the vegetables, particularly the frozen aromatic herbs or the like obtained as a result of their use.

PRIOR ART

Installations for the preparation and packaging of fresh legumes and vegetables are already known. According to the document FR-A-2,561,076, such an installation comprises the following steps: separation - bursting; sorting; washing; rinsing; spinning; drying; irradiation; thermotreatment; oiling; spinning; weighing; packaging. This document neither describes nor mentions a possible freezing of the vegetables.

Also known are processes and installations for the preparation of frozen legumes, conventionally comprising, in a line from upstream in the downstream direction, a step or station for washing, dressing, peeling, cutting, treatment and then either boxing and then freezing (the latter being in block form) or rapid individual freezing in a fluidized bed and then packaging.

Reference may be made, for example, to documents: BE-A-809,014, according to which dry ice is used; FR-A-2,512,533, according to which bulk cooling is carried out in a longitudinally subdivided rotary drum with perforations over the entire cylindrical side wall; FR-A-2,316,559, according to which the cooling means are twofold: by pulsed air and by cryogenic fluid; U.S. Application No. 3,592,666, according to which the legumes are previously heated to 80° C. and 100° C. and are subsequently frozen immediately thereafter; FR-A-2,171,862, according to which the fruits and legumes in question, in the coarse picked state, are subjected to the action of sulfurous anhydrite; JP-A-63.294738, according to which the legumes are cut in contact with water, washed and immediately thereafter frozen.

According to the document FR-A-2,400,847, a process for producing frozen and peeled tomatoes comprises a succession of the following steps: freezing; dry cleaning with brushes; peeling by abrasion; additional freezing. An installation for putting this process into practice comprises a freezing device; a conveyor band; a brush machine working dry; a second conveyor band; an abrasion-peeling machine; a selection band; and an additional freezing tunnel. According to the essential characteristic, therefore, this process and this machine, which are designed specifically for tomatoes, provide two freezings separated by a cleaning and a peeling.

Also known is the preparation of frozen aromatic herbs or the like (dill, basil, celery, chervil, coriander, cress, spinach, tarragon, lovage, marjoram, mint, sorrel, parsley, rosemary, savory, thyme, sage, oregano, lavender, chive, garlic, shallot, onion) according to processes and by means of installations such as those mentioned above or the equivalent. Reference may thus be made to the document BE-A-1,001,589 which discloses the block freezing of vegetables before they are subjected to suitable mechanical treatment (crushing, rolling, pounding, etc.), this freezing making it possible to preserve the organoleptic qualities of the vegetables, but not allowing a selective packaging of the consumable parts. On the contrary, according to this document, the entire treated plant is reduced to powder.

However, where aromatic herbs or the like are concerned, the prior techniques present some problems or have particular limits. Thus, it is often difficult or even impossible to separate the leaves from the stalks of the vegetable in a fresh state. The cutting of the vegetable causes an injury; the vegetable may be squashed or its cells, then open, may empty. These open cells are oxidized, and this impairs the organoleptic qualities, particularly the aroma. The dressing, sorting, peeling and cutting operations require a considerable labor force with the known problems regarding bacteriological efficiency and safety, cost price, etc.

SUMMARY OF THE INVENTION

The subject of the invention is, therefore, a process and an installation for the preparation of frozen vegetables (especially aromatic plants) which overcome the problems or limits mentioned above.

An installation for the preparation of frozen vegetables, specially designed for the preparation of aromatic herbs or plants, comprises, from upstream in the downstream direction and starting from
a feed of fresh vegetables in bulk;
and a feed of empty packs:
- a) a device for washing the fresh vegetables at the exit of the vegetable feed and a device for the spin-drying of the washed vegetables;
- b) a freezing device of the rapid individual type;
- c) at least one device suitable for exerting on the vegetables in the frozen state sufficient mechanical stresses to allow them to be broken into a plurality of fractions, especially the leaves and stalks;
- d) at least one sorting device located at the exit of the preceding device, in order to separate the uniform fractions from one another, these being in the frozen state;
- e) a device for packaging at least one of the fractions which are in the frozen state, namely the fraction to be used, particularly the leaves;
- f) means for disposing of the fraction or fractions coming from the sorting device and intended not to be used, namely the stalks.

A process for the preparation of frozen vegetables, specially designed for the preparation of aromatic herbs or plants, in which fresh vegetables in bulk and empty packs are fed, comprising the successive steps involving:
- a) washing the fresh vegetables;
- b) spin-drying the washed vegetables;
- c) freezing the washed and dried vegetables rapidly and individually;
- d) maintaining the vegetables thus frozen in this state;
- e) exerting on them sufficient mechanical stresses to allow them to be broken into a plurality of fractions, especially the leaves and the stalks;
- f) sorting them in order to separate the uniform fractions from one another;
- g) packaging at least one of the fractions in the frozen state, namely the fractions to be used, especially the leaves;
- h) disposing of the sorted fraction or fractions intended not to be used, namely the stalks.

According to other characteristics, the installation also comprises a device for the pasteurization of the washed and coarsely fractionated cut dried vegetables by heating and then by a cooling of the vegetables thus pasteurized to a temperature of the order of the ambient temperature. It also comprises a device for the coarse fractionation of the washed vegetables, located downstream of the washing device and upstream of the freezing device. The washing, coarse fractionation and freezing devices suitable for exerting mechanical stresses for comminuting, for sorting, packaging and for pasteurizing are arranged to operate continuously. The devices suitable for exerting mechanical stresses for sorting and for packaging are located in a thermal containment which is at a temperature in the neighborhood of the freezing temperature, such as a chilled room. The installation comprises a plurality of pairs of at least one device suitable for exerting mechanical stresses and of at least one sorting device which are arranged in series from upstream in the downstream direction. A device suitable for exerting mechanical stresses is a beater, a crusher or a pounder. A sorting device operates by granulometric, densimetric, pneumatic or calorimetric sorting or according to the actual shape of the sorted fractions.

According to another aspect, the invention relates to a process for the treatment of vegetables, specially designed for the treatment of aromatic herbs or plants, comprising the successive steps involving:
a) freezing the vegetables rapidly and individually;
b) maintaining the vegetables thus frozen in this state;
c) exerting on them sufficient mechanical stresses to allow them to be broken into a plurality of fractions, especially the leaves and stalks.

The implementation of the invention affords many advantages: first of all, it makes it possible to overcome the abovementioned problems or limits encountered in the known state of the art. Moreover, the vegetables are not damaged, bruised, squashed or soiled. Losses are reduced to a minimum. The cost price is improved. As regards vegetables having stalks and leaves, only the latter, which are consumable, are packaged, the stalks being rejected. It is also possible to make mixtures of a plurality of homogeneous vegetables without defrosting. The invention can also be put into practice outside the harvesting season.

As emerges from the foregoing, the invention is concerned with the cold mechanical comminution of vegetables. The steps of the process can be included or not in the installation line considered in detail here as a possible embodiment.

BRIEF DESCRIPTION OF THE DRAWINGS

FIG. 2 is a continuation of FIG. 1 along the stream direction of the process.

DESCRIPTION OF THE PREFERRED EMBODIMENT

Figure 1:
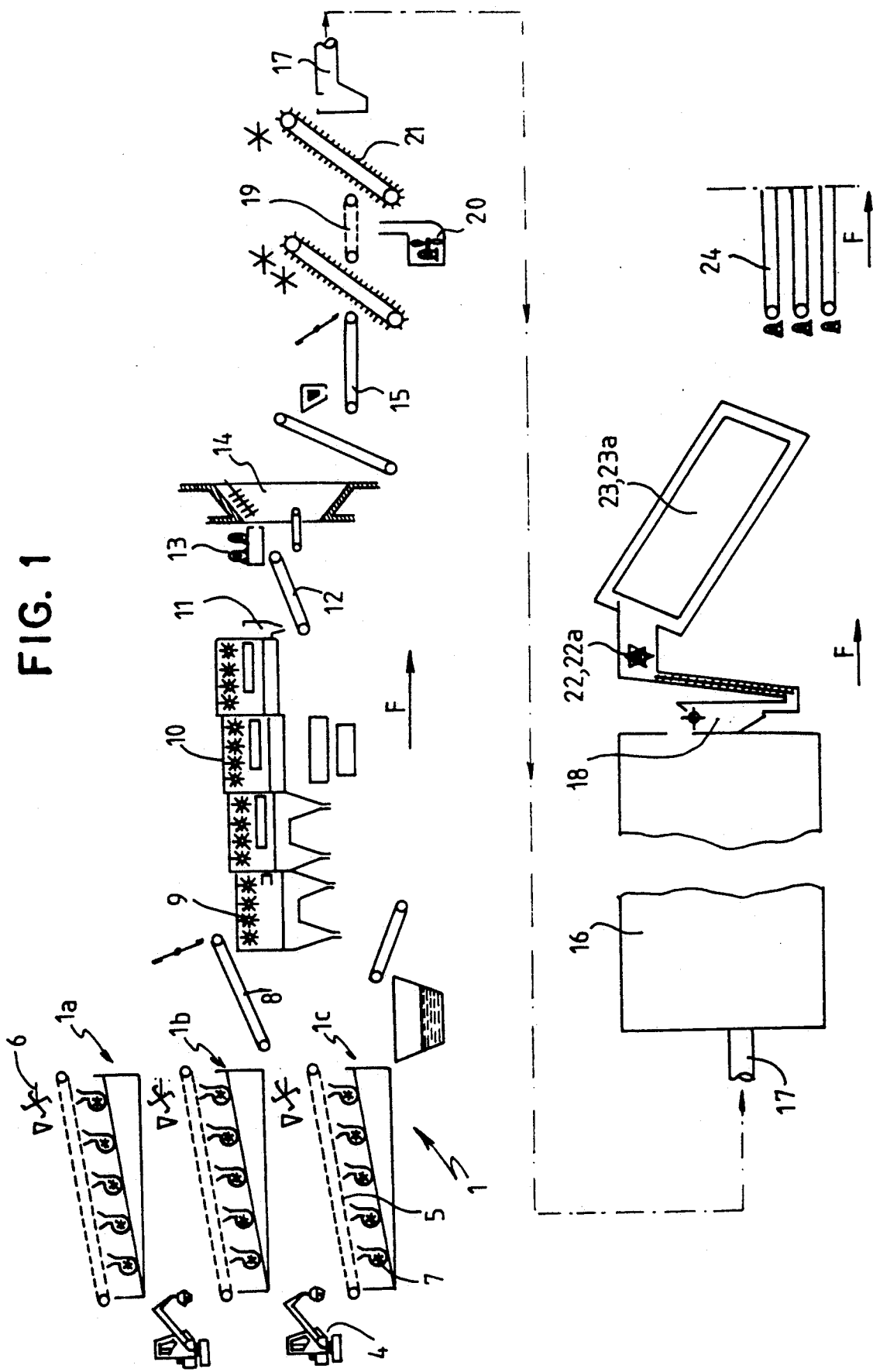
FIG. 1 is a block schematic diagram of an exemplary embodiment of both a process and apparatus of the present invention.

The invention relates to the preparation of frozen vegetables and more particularly of vegetables intended for human consumption, such as aromatic herbs or plants or the like. The invention can typically be employed, for example, when only the leaves of the plant in question are to be frozen, whereas its unwanted stalks have to be eliminated.

The process and installation illustrated in the Figure are arranged to operate continuously and in fact operate in this way. However, an intermittent batch arrangement and operation can also be considered.

In the relevant embodiment, the continuous preparation line, the stations or devices of component members of which are intended for executing the constituent steps of the process, extends between an upstream entrance 1, which is a feed of fresh vegetables in bulk, and a downstream exit 2, where the prepared and frozen vegetables are packaged, ready to be stored or dispatched or consumed. The line also has a feed 3 of empty packs.

In the text, the words "upstream" and "downstream" refer to the direction of advance of the vegetables on and along the line (arrow F). These words are respectively equivalent to "before" or "after" used for the steps of the process.

The feed 1 can comprise a plurality of separate assemblies 1a, 1b, 1c allowing a greater operating flexibility. Each of its assemblies can comprise a handling appliance 4, a conveyor belt 5, a feed wheel 6 and fans 7 placed under the belt 5 which is therefore perforated.

Downstream of the feed 1, a conveyor belt or the like 8 brings the vegetables to the upstream entrance 9 of a washing device 10 which can be in the form of a plurality of subassemblies in series. This washing device 10 executes the step in which the fresh vegetables are washed.

At the downstream exit 11 of the washing device 10 and therefore downstream of the latter is a take-up conveyor belt 12 which drives the vegetables towards a device 13 for the coarse fractionation of the washed vegetables. This device 13 is intended to prevent the subsequently treated vegetables from taking the form of agglomerated compact blocks. This device 13 therefore carries out the fractionation of such possible bulky blocks into smaller pieces.

At the exit of the device 13, that is to say downstream of the latter, there is a device 14 for the spin-drying of the previously washed vegetables fractionated or not.

In the embodiment under consideration, the coarse fractionation device 13 is placed just downstream of the washing device 10 and just upstream of the drying device 14.

According to another variation, the vegetables are dried, before being fractionated, the devices being arranged in the following order from upstream in the downstream direction: 10, 14, 13.

If appropriate, the drying or the fractionation is carried out in a plurality of successive steps. These steps can overlap in terms of the drying and fractionation, for example in the form of a plurality of pairs, each comprising a drying (or fractionation) step and a fractionation (or drying) step.

The fractionation 13 and drying 14 devices are intended respectively for executing the fractionation and drying steps of the process used.

In the embodiment under consideration, there is also a distributor device 15 located downstream of the washing and drying devices 10, 14, especially just downstream of the drying device 14.

This distributor device 15 is itself located upstream of a freezing device 16.

This freezing device 16, such as a freezing tunnel, makes it possible to bring the vegetables to the desired freezing temperature, for example of the order of $-180°$ C. to $-40°$ C., to their core progressively from the upstream entrance 17 to the downstream exit 18. Preferably, this step of freezing the washed and dried vegetables is of the rapid individual (or IQF) type, thus making it possible to prevent the vegetables thus frozen from setting in a mass.

In the embodiments under consideration, there is also a device 19 for the pasteurization of the vegetables, located between the washing and drying devices 10, 14 and the freezing device 16. This pasteurization device 19 can comprise means 20 ensuring a heating of the vegetables and located upstream, followed in the downstream direction by a device 21 for cooling the vegetables thus previously heated and pasteurized to a temperature of the order of the ambient temperature from which the plants were frozen.

In the embodiment under consideration, downstream of the pasteurization device 19 the vegetables are protected in order to prevent any soiling or contamination.

Downstream of the freezing device 16 are arranged, on the one hand, at least one device 22 suitable for exerting on the plants, then in the frozen state and therefore made brittle, sufficient mechanical stresses to allow them to be broken into a plurality of fractions, especially the leaves and stalks, and at least one device 23 located at the exit of the device 22 in order to separate the uniform fractions from one another, these being in the frozen state.

In the embodiment under consideration, there are a plurality of devices 22 and a plurality of devices 23 which are each arranged in series from upstream in the downstream direction. The devices 22, 23 are organized in pairs of at least one device 22 and of at least one device 23, and a plurality of pairs 22, 23 is provided in series from upstream in the downstream direction. This constructive arrangement is intended for ensuring optimum fractionation and sorting.

In the embodiment under consideration, the device 22 is a beater, a crusher, a pounder, a comminutor or a mill.

The device 23 operates by granulometric, densimetric, pneumatic or calorimetric sorting or else according to the actual shape of the sorted fractions.

The various devices 22, 23 or pairs of devices 22, 23 are connected by means of conveyor belts 24, belts, screws or chains.

In the embodiment under consideration, there are, from upstream in the downstream direction and starting from the downstream exit 18 of the freezing device 16:
a beating device 22a of a type generally similar to that used in harvester-threshers;
a grid distributor 23a;
two pairs of crushers 22b;
two pneumatic separating cyclones 23b;
a final screen 23c.

At the exit of the last sorting device furthest downstream, in this particular instance the screen 23c, are arranged at least two conveyors, namely at least one conveyor 25 for at least one consumable fraction and at least one conveyor 26 for the scraps which are separated from the consumable fraction and which are not sold to the consumer of this consumable fraction.

If appropriate, there can be a plurality of conveyors 25 and/or 26 corresponding to a plurality of granulometries or qualities.

At the downstream exit 27, the conveyor 26 discharges the scraps towards a disposal 28 which can also recover the scraps coming from the other sorting devices arranged upstream 23a, 23b.

At the downstream exit 29 of a conveyor 25 or of each of the conveyors 25 for a consumable fraction or consumable fractions is located at least one or more packaging devices 30.

The packaging device 30, like the devices 22, 23, work on vegetables in the frozen state. For this purpose, the process includes a step involving maintaining the vegetables in this state while mechanical stresses are being exerted on them and they are being sorted and packaged. The installation also possesses a corresponding device or corresponding means.

In the embodiment under consideration, the devices suitable for exerting mechanical stresses 22, for sorting 23 and for packaging 30 are arranged in a thermal containment 31 which is at a temperature in the neighborhood of the freezing temperature, such as a chilled room. Consequently, the devices 22, 23, 30 must be of a type suitable for operating at the temperatures in question.

The packaging device 30 comprises a feed 3 of packs, such as small cardboard boxes or cases which are then empty and open; means 32 for proportioning the frozen vegetables in such a way that a predetermined known quantity of vegetables in the frozen state is transferred into the boxes or cases; means 33 for closing, marking and labeling the boxes or cases. The device 30 can also include wrapping means employing crates 35 which are themselves grouped together to form a palletized load 36.

It goes without saying that the means described can be replaced by equivalent means. This applies particularly to the conveyor belts which can be replaced by endless screws or the like.

At the exit 2, the vegetables are in packaged form and are wrapped in the frozen state, only the useful fraction (in this particular instance the consumable fraction) having been packaged and wrapped.

Although the present invention has been described with reference to a specific embodiment, those of skill in the art will recognize that changes may be made thereto without departing from the scope and spirit of the invention as set forth in the appended clams.

I claim:

1. A process for the preparation of frozen vegetables, of the type in which the vegetables are first frozen and then broken in the frozen state, defined in that it comprises, starting from a feed of fresh vegetables in bulk and from a feed of empty packs, the successive steps involving;
   a) washing the fresh vegetables;
   b) spin-drying the washed vegetables;
   c) freezing the washed and dried vegetables rapidly and individually;
   d) maintaining the vegetables thus frozen in this state;
   e) exerting on them sufficient mechanical stresses to allow them to be broken into a plurality of fractions;
   f) sorting them in order to separate uniform fractions from one another;
   g) packaging at least one of the fractions to be used in the frozen state;
   h) disposing of the sorted fraction or fractions intended not to be used.

2. The process as claimed in claim 1, wherein a rapid individual freezing of the order of $-18°$ C. to $-40°$ C. is carried out.

3. The process as claimed in claim 1, wherein mechanical stresses are exerted by a process selected from the group consisting of beating, crushing, and pounding.

4. The process as claimed in claim 1, wherein a granulometric, densimetric, pneumatic or calorimetric sorting or a sorting according to the actual shape of the sorted fraction is carried out.

5. The process as claimed in claim 1, wherein the work is carried out continuously.

6. The process as claimed in claim 1, wherein the work is carried out intermittently in batches.

7. The process as claimed in claim 1, wherein the exertion of the mechanical stresses and the sorting are carried out in a plurality of steps or pairs of steps.

8. A process for the treatment of vegetables, of the type in which the vegetables are first frozen and then broken in the frozen state, defined in that it comprises the successive steps involving:
   a) freezing the vegetables rapidly and individually in a hard frozen state;
   b) maintaining the vegetables thus frozen in this state;
   c) exerting on the vegetables sufficient mechanical stresses to allow them to be broken into a plurality of fractions, the resulting fractions in the hard frozen state.

9. The process as claimed in claim 8, wherein the step of exerting on the vegetables sufficient mechanical stresses is further characterized in that the plurality of fractions comprises a fraction of leaves and a fraction of stalks.

10. The method as claimed in claim 9, comprising the further steps of:
    sorting the leaves and the stalks;
    packaging the leaves; and
    disposing the stalks;

11. The process as claimed in claim 10 comprising the further steps of:
    before freezing the vegetables, washing the vegetables; and
    spin-drying the thus washed vegetables.

* * * * *